United States Patent
Kim

(10) Patent No.: US 8,963,389 B2
(45) Date of Patent: Feb. 24, 2015

(54) TERMINAL CONNECTION STRUCTURE FOR THE MOTOR

(75) Inventor: Jihun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 311 days.

(21) Appl. No.: 13/555,808

(22) Filed: Jul. 23, 2012

(65) Prior Publication Data

US 2013/0069457 A1 Mar. 21, 2013

(30) Foreign Application Priority Data

Sep. 21, 2011 (KR) .......................... 10-2011-0095177

(51) Int. Cl.
*H02K 5/22* (2006.01)
*H02K 3/52* (2006.01)

(52) U.S. Cl.
CPC ............... *H02K 3/522* (2013.01); *H02K 5/225* (2013.01)
USPC .......................................................... 310/71

(58) Field of Classification Search
CPC ................................ H02K 5/22; H02K 5/225
USPC .......................................................... 310/71
See application file for complete search history.

(56) References Cited

U.S. PATENT DOCUMENTS

| | | | |
|---|---|---|---|
| 4,642,885 A * | 2/1987 | King .............................. | 29/596 |
| 4,925,398 A * | 5/1990 | Samejima et al. ............ | 439/357 |
| 5,127,845 A * | 7/1992 | Ayer et al. ..................... | 439/395 |
| 5,235,230 A * | 8/1993 | Yuhi et al. ...................... | 310/71 |
| 7,109,618 B2 * | 9/2006 | Cha ................................ | 310/71 |
| 7,476,996 B2 * | 1/2009 | Makiuchi et al. .............. | 310/71 |
| 2009/0140585 A1 * | 6/2009 | Pant .............................. | 310/71 |

* cited by examiner

*Primary Examiner* — Tran Nguyen
*Assistant Examiner* — Thomas Truong
(74) *Attorney, Agent, or Firm* — Saliwanchik, Lloyd & Eisenschenk

(57) ABSTRACT

Disclosed terminal housing connection structure for the motor is comprising: an insulator body; a terminal housing assembly unit protruding circumferentially and being combined with the insulator body integrally; a terminal housing having sliding hook combination with the terminal housing assembly unit, thus being capable of supplying a power to the motor; a fixing unit locking the position of terminal housing in the terminal housing assembly unit and comparting the coil unit of the insulator body with the terminal housing.

10 Claims, 3 Drawing Sheets

TERMINAL CONNECTION STRUCTURE FOR THE MOTOR

CROSS-REFERENCE TO RELATED APPLICATION

This application claims the benefit under 35 U.S.C. §119 of Korean Patent Application No. 10-2011-0095177, filed Sep. 21, 2011, which is hereby incorporated by reference in its entirety.

BACKGROUND

1. Field of the Invention

The present invention relates terminal connection structure for the motor.

2. Description of the Related Art

Generally, a BLDC motor with electronic rectifier does not need a brush and a commutator in a DC motor, and it has advantage of that it does not develop not only mechanical noise but electrical noise.

The BLDC motor comprises a stator which is installed in the motor housing and frame etc, a magnet rotor which is inserted in the inner part of the stator for rotation, and an axis which is fixedly inserted in the central part of the rotor.

A coil winds around a stator core of a stator, and the stator can be arranged with various types. The composition of the stator composed of plural individual electromagnet core segments set in the same axis with a rotation axis is stated in the Korean Patent No. 2004-0101572, released on Feb. 2, 2004.

For the segment consisting of the stator, it is configured with silicon steel sheets within 1 mm thickness, which are punched with a press machine and layered. Each silicon steel sheet is composed of a cylinder type yoke unit, plural teeth units protruding toward the center at regular intervals along the circumferential direction on the inner circumferential surface of the yokes unit, and a polarized pole unit protruding on the both sides at the end of the teeth units.

Multiple slots are formed for the coil winding among the teeth units, and a insulator is inserted in the slots for the purpose of insulating between the stator core and the coil. This insulator is combined to be inserted with sealing on the both sides along the layered direction of the stator core.

The insulator is configured with a terminal housing connection unit integrally, and a terminal housing for power supply has sliding combination with the terminal housing connection unit. Generally, the terminal housing and the insulator are made of synthetic resin by injection molding. The gap between the terminal housing connection unit and the terminal housing will increase after combination, thus the terminal housing can be easily separated when the position for power-on assembly is combined.

Further such a gap is positively in need for the combination of other parts, but the gap makes a rigidity of the housing drop, and has problem that causes a function loss or a damage of the motor due to a weakness for the vibration.

BRIEF SUMMARY

Accordingly, an object of the present invention is to provide terminal housing connection structure, which is constructed to have improved structure to improve potential failure and assembly property by means of increasing the terminal gap and moving interval for the power and signal transmission, thus being capable of making fraction defective and productivity improved.

The terminal connection structure for the motor by the present invention comprises the coiled insulator body composing stator; the terminal housing assembly unit protruding circumferentially and being combined with the insulator body integrally; the terminal housing having sliding hook combination with the terminal housing assembly; and plural terminals being inserted and installed in terminal housing. The terminal comprises the coil connection unit which is exposed from the terminal housing and is connected by the coil, and which is pivotally supported on one end of the housing assembly unit about a tension of the connected coil; the power connection unit of the other end of the coil connection unit, which is inserted in the inner part of the terminal housing without exposure, and which has a designed distance with the inner space of the terminal housing thus is capable of moving as much as the designed distance if power unit is connected.

Preferably, but not necessarily, the terminal housing assembly unit comprises a pair of guide plate, which is formed protrusively from the insulator body and is formed in a parallel direction to the insertion direction of the terminal housing; and a protruded hook, which is formed protrusively on the outside of the guide plate, and is fitted adjustably in the connecting hole of sidewall of the terminal housing.

Preferably, but not necessarily, the protruded hook comprises a sliding inclination surface, which is formed in the facing direction of the insertion direction of the terminal housing; and a hitching sill, which is formed at a surface opposite to the sliding inclination surface and is hooked in the connecting hole.

Preferably, but not necessarily, the connecting hole is extended from the both sidewall of the terminal housing, and is formed penetratingly as a quadrangle in the inside of assembling plate having a surface contact with the guide plate.

Preferably, but not necessarily, the inner wall facing the power connection unit of the terminal housing is formed as taper-shaped and the distance with the power connection unit is increased toward the end of the power connection unit.

Preferably, but not necessarily, the power connection unit comprises a pair of first terminal and second terminal arranged as facing each other, and the ends of the first terminal and second terminal facing each other are rounded. The terminal holder comprises supporting rib, which supports the junction of the first terminal and the second terminal.

The advantage according to the present invention is that product quality is improved by improving assembly property and productivity, and by reinforcing the rigidity of the housing because the terminal gap and the moving interval are increased.

DETAILED DESCRIPTION

Hereinafter, the terminal connection for the motor will be described in detail with reference to the accompanying drawings.

Figure 1:
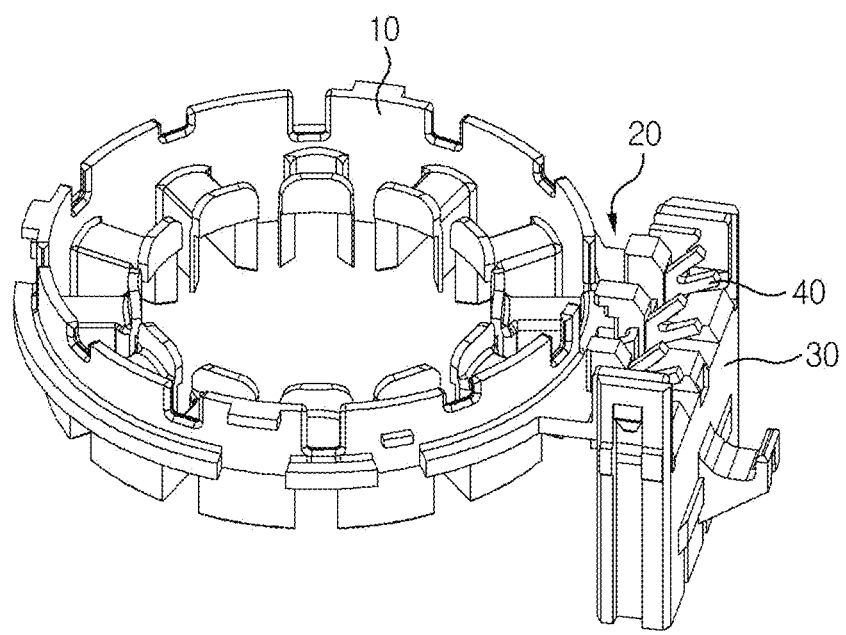
FIG. 1 is a perspective view showing terminal connection structure for the motor according to the present invention.
Figure 2:
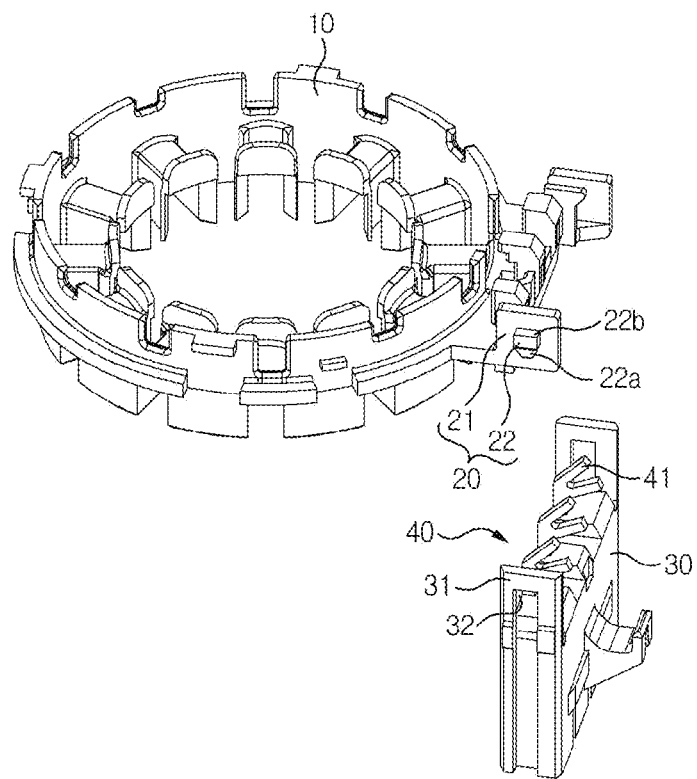
FIG. 2 is an exploded perspective view of FIG. 1.
Figure 3:
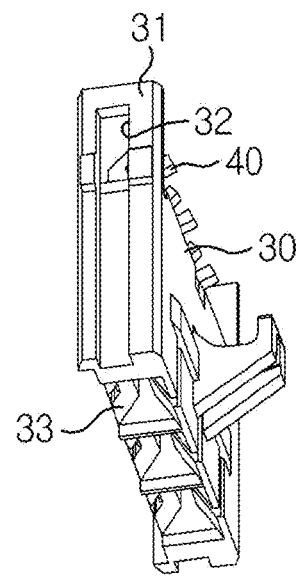
FIG. 3 is a rear perspective view of the terminal housing shown in FIG. 1.
Figure 4:
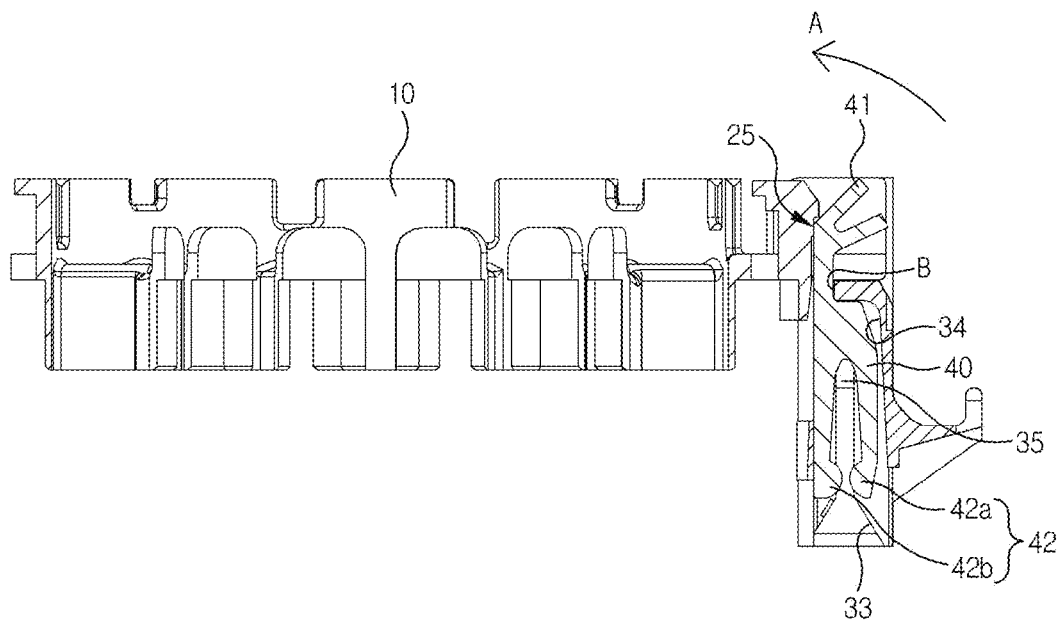
FIG. 4 is a side sectional view of the terminal housing according to an exemplary embodiment of the present disclosure.
Figure 5:
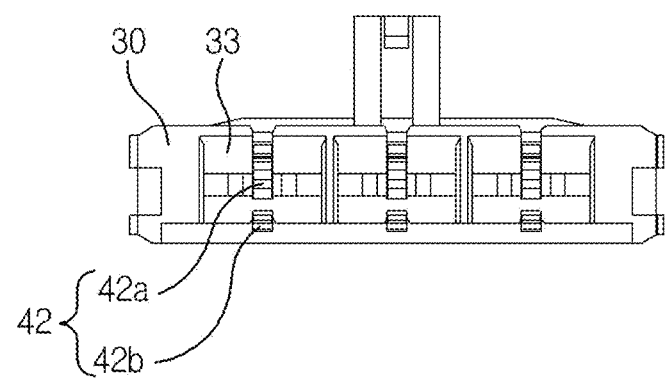
FIG. 5 is a bottom view of the terminal housing according to an exemplary embodiment of the present disclosure.

FIG. 1 is a perspective view showing terminal connection structure for the motor according to the present invention, FIG. 2 is an exploded perspective view of FIG. 1, FIG. 3 is a rear perspective view of the terminal housing shown in FIG. 1, FIG. 4 is a side sectional view of the terminal housing according to an exemplary embodiment of the present disclosure, and FIG. 5 is a bottom view of the terminal housing according to an exemplary embodiment of the present disclosure.

The present invention relates to the connection structure of terminal housing, which supplies power by the motor for insulator arranged in the BLDC motor. Therefore, a explanation for composition regarding the stator which is installed in the motor housing and frame which both are general components of the BLDC, the magnet rotor which is inserted in the inner part of the stator for rotation, and the axis which is fixedly inserted in the central part of the rotor is omitted. Also a explanation for the composition of general motor as the coiling composition to the stator core which is a component of stator and is configured with silicon steel sheets within 1 mm thickness, which are punched with a press machine and layered.

As shown, the roughly ring-shaped insulator body (10) has terminal housing assembly unit (20) which is arranged integrally to be protruded at the side end. Generally the insulator body (10) is made of synthetic resin by injection molding, thus it is preferable the terminal housing assembly unit is made of same material with insulator body (10) by injection molding. The terminal housing (30) for connection with power unit not shown is removably assembled to the terminal housing assembly unit (20).

The terminal housing assembly unit (20) comprises the guide plate (21) and the protruded hook (22).

The guide plate (21) is formed protrusively from the insulator body (10), and is formed in a parallel direction to the insertion direction of the terminal housing (30). Further the guide plate (21) supports a sidewall (31) of the terminal housing (30) from the inside.

The protruded hook (22) is formed protrusively on the outside of the guide plate (21), and it is preferable that it is fitted adjustably in the connecting hole (32) of the sidewall (31) of the terminal housing (30), and it makes the terminal housing (30) fixed to the terminal housing assembly unit (20).

The protruded hook (22) comprises the sliding inclination surface (22a) and the hitching sill (22b).

The sliding inclination surface (22a) is formed in the facing direction of insertion direction of the protruded hook (22) into the terminal housing (30), thus being capable of reducing repulsive force with the sidewall (31) interfered with it when the terminal housing (30) is inserted and assembled, and further being capable of making a easy elastic deformation of the sidewall (31) until the protruded hook (22) is fitted adjustably to the connecting hole (32).

The hitching sill (22b) is formed at the surface opposite to the sliding inclination surface (22a), and is hooked to the connecting hole (32). Preferably as shown in FIG. 2, the top surface is arranged as flat square-shaped, and is made to have surface contact with the top of inner circumferential surface of the connecting hole (32) when connected with the connecting hole (32).

The terminal housing (30) has sliding hook combination with the terminal housing assembly unit (20). The terminal housing (30), as shown in FIG. 1 or FIG. 3, is arranged as roughly hexahedron-shaped, thus a part of the terminal (40) is exposed to the upper end of the figure, and the power unit not shown is connected to the lower end.

Both sidewalls (31) of the terminal housing (30) are extended upward, and as shown in FIG. 1 and FIG. 2, each sidewall (31) is extended to be parallel to the direction of insertion of the terminal housing (30), thus is supported by the inner surface contact of the guide plate (21) when combined to the terminal housing assembly (20).

At the end of the sidewall (31), the connecting hole (32) is formed penetratingly in the position corresponding to the protruded hook (22). According to an exemplary embodiment of the present invention, it is preferable that the connecting hole (32) is arranged as a quadrangle in order to make the hitching sill (22b) of the protruded hook (22) hooked at the position of insertion.

Further, it is preferable that taper entry unit (33) is arranged on a bottom surface of the terminal housing (30) in order to make insertion of the power unit not-shown easy. The taper entry unit (33) guides the insertion path of the power unit, and makes the power unit electrically connected with the terminal arranged in the terminal housing (30).

The terminal (40) is inserted and installed in the terminal housing (30), and it is preferable that the plural are placed at regular interval. According to an exemplary embodiment of the present invention, it is preferable that the number is made in accordance with the used polarity of the terminal (40). If a three-phase power which is generally used is admitted, three terminals can be made to be connected with the polarized power of U, V, and W.

The terminal (40) comprises the coil connection unit (41) and power connection unit (42).

The coil connection unit (41) exposed from the terminal housing (30) is connected with the coil is not shown, and has roughly "Y" shaped as shown in FIG. 1 and FIG. 2

The coil connection unit (41), as shown in FIG. 4, has a some surface contact with the one side wall of terminal housing connection unit (20), and the contacts becomes a pivot point, thus the terminal (40) can move in a certain distance. In other words, if the coil winds the coil connection unit (41), the coil connection unit (41) undergoes a tension in the direction of arrow "A" by a tension of the coil, and then the tension becomes momental force and acts as a rotating force for the whole of the thermal (40). But a unlimited rotation can be inhibited because the front portion of the coil connection unit (41) is supported by the one end (B) of terminal housing (30).

The power connection unit (42) has a designed distance with the inner space of the terminal housing thus is capable of moving and being arranged as much as the designed distance when the power unit is connected. According to an exemplary embodiment of the present invention, the power connection unit (42) comprises the first terminal (42a) and the second terminal (42b).

The end of the first terminal (41a) and the second terminal (42b), as shown, is rounded, thus the power unit not shown can be smoothly inserted and connected.

Further, the inner wall facing the power unit of the terminal housing (30) is made as taper-shaped, and it is preferable that the distance with the first terminal unit (42a) and the second terminal unit (42b) which are composing the power connection unit (42) are increasing toward the end of the power connection unit (42). According to the described composition, the mobility of the first terminal unit (42a) and the second terminal unit (42b) can be greater than a conventional composition.

The inside space of the terminal holder (30) comprises supporting rib, which supports the junction of the first terminal unit (42a) and the second terminal unit (42b), thus the terminal (40) can be fixedly located by the supporting rib (35).

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A terminal connection structure for a motor, the structure comprising:
    an insulator body comprising a stator and a coil;
    a terminal housing assembly unit protruding from and monolithically formed with the insulator body;
    a terminal housing having a sliding hook combination with the terminal housing assembly unit; and
    a terminals in the terminal housing, wherein the terminal comprises:
    a coil connection unit exposed out of the terminal housing and connected to the coil; and
    a power connection unit at an opposite end of the terminal from the coil connection unit,
    wherein the power connection unit is physically separated from an inner surface of the terminal housing by a predetermined distance such that the power connection unit is capable of moving up to the predetermined distance when connected to a power unit, and
    wherein the power connection unit is disposed within the terminal housing such that the power connection unit is surrounded by the terminal housing in every direction that is parallel to a radius of the insulator body.

2. The structure of claim 1, wherein the terminal housing assembly unit comprises:
    a guide plate supporting a sidewall of the terminal housing from the inside, wherein the guide plate is formed protrusively from the insulator body and is parallel to the insertion direction of the terminal housing; and
    a protruded hook formed protrusively on the outside of the guide plate and is fitted adjustably in a connecting hole of the sidewall of the terminal housing.

3. The structure of claim 2, wherein the protruded hook comprises:
    a sliding inclination surface having a surface that inclines in an insertion direction of the terminal housing; and
    a hitching sill formed at a surface of the protruded hook opposite to the sliding inclination surface, wherein the hitching sill is configured to hook in the connecting hole of the sidewall of the terminal housing.

4. The structure of claim 2, wherein the connecting hole has a quadrangle shape and is formed penetratingly through the sidewall of the terminal housing.

5. The structure of claim 4, wherein the sidewall is in contact with the guide plate.

6. The structure of claim 1, wherein the inner surface separated from the power connection unit of the terminal housing has a tapered shape, and wherein the distance between the inner surface and the power connection unit is increased at the end of the power connection unit.

7. The structure of claim 1, wherein the power connection unit comprises a first terminal and a second terminal arranged to face each other, and wherein an end of the first terminal is round and an end of the second terminal is rounded.

8. The structure of claim 7, wherein the terminal housing comprises a supporting rib, wherein the supporting rib supports a junction of the first terminal and the second terminal.

9. The structure of claim 1, wherein the coil connection unit is pivotally supported on an end of the housing assembly unit about a tension of the coil.

10. The structure of claim 1, wherein the coil connection unit has a "V" shape.

* * * * *